(12) United States Patent
Lavoie et al.

(10) Patent No.: US 11,097,579 B2
(45) Date of Patent: Aug. 24, 2021

(54) COMPENSATION FOR TRAILER COUPLER HEIGHT IN AUTOMATIC HITCH OPERATION

(71) Applicant: Ford Global Technologies, LLC, Dearborn, MI (US)

(72) Inventors: Erick Michael Lavoie, Dearborn, MI (US); Luke Niewiadomski, Dearborn, MI (US); Roger Arnold Trombley, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 251 days.

(21) Appl. No.: 16/183,825

(22) Filed: Nov. 8, 2018

(65) Prior Publication Data

US 2020/0148018 A1    May 14, 2020

(51) Int. Cl.

| | |
|---|---|
| *B60D 1/00* | (2006.01) |
| *B60D 1/36* | (2006.01) |
| *B60W 10/22* | (2006.01) |
| *B60W 10/20* | (2006.01) |
| *B60W 10/18* | (2012.01) |
| *G05D 1/02* | (2020.01) |
| *B60W 10/04* | (2006.01) |
| *B60D 1/06* | (2006.01) |

(52) U.S. Cl.
CPC .............. *B60D 1/36* (2013.01); *B60W 10/04* (2013.01); *B60W 10/18* (2013.01); *B60W 10/20* (2013.01); *B60W 10/22* (2013.01); *G05D 1/0231* (2013.01); *G05D 1/0257* (2013.01); *B60D 1/06* (2013.01); *B60W 2420/42* (2013.01); *B60W 2420/52* (2013.01); *B60W 2420/54* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 4,836,733 A * | 6/1989 | Hertel | H01L 21/67259 198/341.05 |
| 5,650,764 A | 7/1997 | McCullough | |
| 6,480,104 B1 | 11/2002 | Wall et al. | |
| 6,970,184 B2 | 11/2005 | Hirama et al. | |
| 2009/0292468 A1 | 11/2009 | Wu et al. | |
| 2010/0213397 A1 * | 8/2010 | Trudeau | B60G 17/0525 251/129.01 |
| 2013/0226390 A1 | 8/2013 | Luo et al. | |
| 2016/0052548 A1 * | 2/2016 | Singh | B60D 1/36 701/37 |
| 2016/0185169 A1 | 6/2016 | Strand | |

(Continued)

FOREIGN PATENT DOCUMENTS

WO    2014174027 A1    10/2014

*Primary Examiner* — Blake A Tankersley
(74) *Attorney, Agent, or Firm* — Raymond Coppiellie; Price Heneveld LLP

(57) ABSTRACT

A vehicle hitch assistance system includes a powered suspension system supporting a rear of the vehicle at a height and a controller. The controller acquires position data for a coupler of a trailer, determines when the position data indicates that a hitch ball of the vehicle is aligned with the coupler, and causes the powered suspension system to raise the height of the rear portion of the vehicle until a threshold resistance value is detected.

16 Claims, 12 Drawing Sheets

(56) References Cited

U.S. PATENT DOCUMENTS

| | | |
|---|---|---|
| 2016/0288601 A1 | 10/2016 | Gehrke et al. |
| 2016/0304122 A1 | 10/2016 | Herzog et al. |
| 2016/0375831 A1 | 12/2016 | Wang et al. |
| 2017/0158007 A1* | 6/2017 | Lavoie .................. B60W 10/30 |
| 2018/0251153 A1* | 9/2018 | Li ............................ B60D 1/06 |
| 2019/0179330 A1* | 6/2019 | Oniwa ..................... G08G 1/00 |
| 2019/0382001 A1* | 12/2019 | Chelian ................. B60W 30/06 |

* cited by examiner

COMPENSATION FOR TRAILER COUPLER HEIGHT IN AUTOMATIC HITCH OPERATION

FIELD OF THE DISCLOSURE

The present disclosure generally relates to a system for assisting in a vehicle-trailer hitching operation. In particular, the present system compensates for trailer coupler geometry in aligning a hitch ball with the coupler during an automated hitching operation.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE DISCLOSURE

According to one aspect of the present disclosure, a vehicle hitch assistance system includes a powered suspension system supporting a rear of the vehicle at a height and a controller. The controller acquires position data for a coupler of a trailer, determines when the position data indicates that a hitch ball of the vehicle is aligned with the coupler, and causes the powered suspension system to raise the height of the rear portion of the vehicle until a threshold resistance value is detected.

Embodiments of the first aspect of the invention can include any one or a combination of the following features:
  the system may further include a steering system, and the controller may further derive a vehicle path from an initial vehicle position to an end position wherein the hitch ball is aligned with the coupler and output a steering control signal to the steering system to maintain the vehicle along the path;
  system may further include powertrain control and brake systems, and the controller may further control the powertrain control and brake systems to cause the vehicle to move along the path from the initial position to the end position;
  system may further include at least one radar unit defining a detection field having at least a portion directed away from the rear portion of the vehicle, and at least a portion of the position data for the coupler may be acquired from the at least one radar unit;
  the at least one radar unit includes left and right rear radar units respectively mounted on left-rear and right-rear corners of the vehicle;
  the system may further comprise at least one of a rear vehicle camera and an ultrasonic sensor, and the controller acquires at least one additional portion of the position data for the coupler from the at least one of the rear vehicle camera and the ultrasonic sensor;
  the controller may further cause the powered suspension system to lower the height of the rear portion of the vehicle prior to the hitch ball of the vehicle reaching the aligned condition with the coupler;
  the position data for the coupler of the trailer may include a height of the coupler, and causing the powered suspension system to lower the height of the rear portion of the vehicle may position the hitch ball of the vehicle at a height lower than the height of the coupler;
  wherein the powered suspension system may raise the height of the entire vehicle until the threshold resistance value is detected; and
  the controller may detect that the threshold resistance value has been met by receiving a measurement of a current drawn by the powered suspension system, integrating the measurement while causing the powered suspension system to raise the height of the rear portion of the vehicle, and monitoring a result of integrating the measurement for a predetermined threshold value indicating that the threshold resistance value is present.

According to another aspect of the present disclosure, a vehicle includes a hitch ball mounted on a rear of the vehicle, a suspension system adjustably supporting the rear of the vehicle at a height, and a controller. The controller acquires position data for a coupler of a trailer, determines when the position data indicates that the hitch ball is aligned with the coupler, and causes the suspension system to raise the height of the rear of the vehicle until a threshold resistance value is detected.

According to another aspect of the present disclosure, a method for assisting a vehicle in hitching with a trailer includes acquiring position data for a coupler of the trailer, determining when the position data indicates that a hitch ball of the vehicle is aligned with the coupler, and causing a powered suspension system supporting a rear of the vehicle at a height to raise the height of the rear portion of the vehicle until a threshold resistance value is detected.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
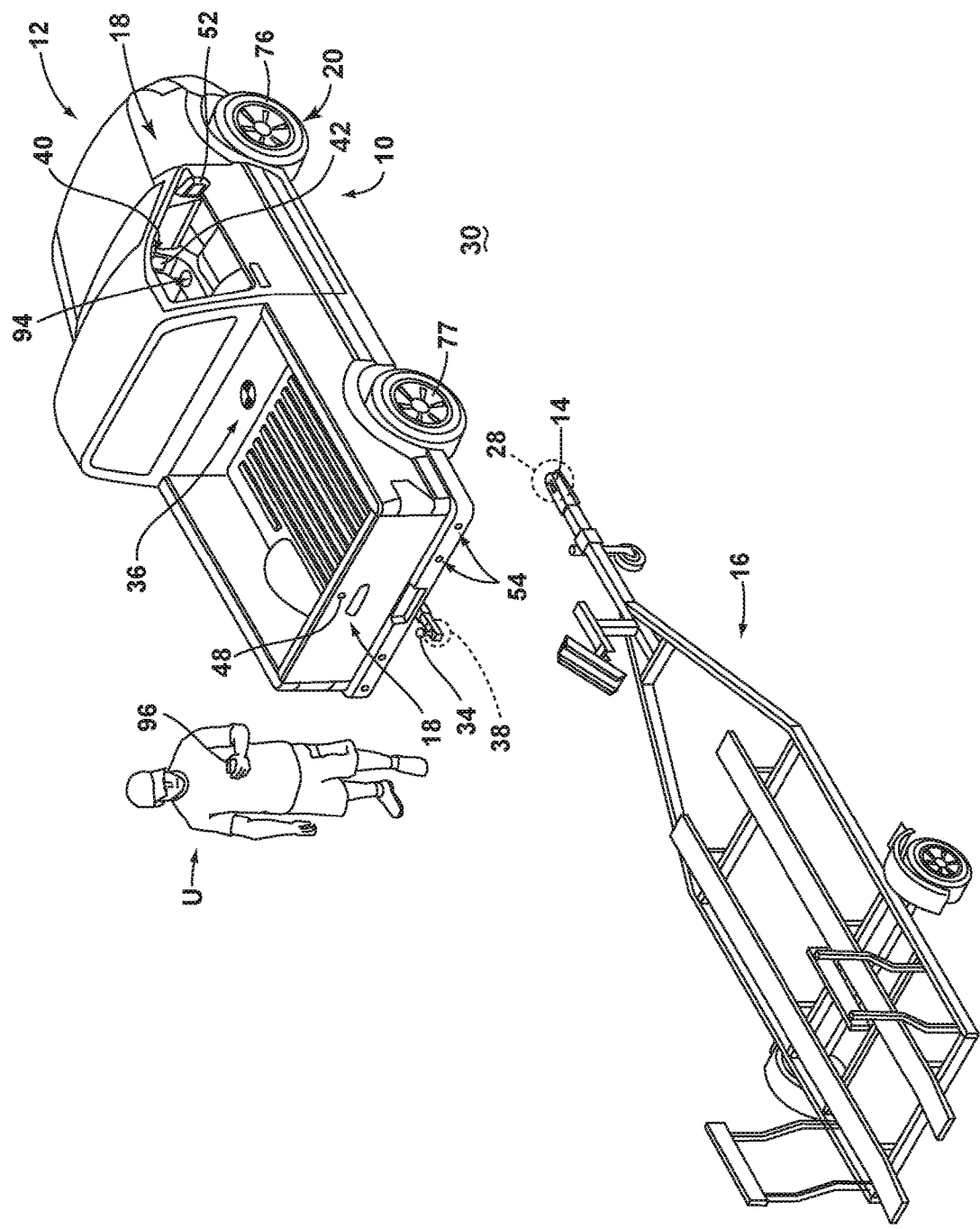
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-11, reference numeral 10 designates a hitch assistance system (also referred to as a "hitch assist" system) for a vehicle 12. In particular, hitch assistance system 10 includes a controller 26 acquiring position data of a coupler 14 of a trailer 16 and deriving a vehicle path 32 to align a hitch ball 34 of the vehicle 12 with the coupler 14. Deriving the vehicle path 32 includes compensating for a determined change in the position 28 of the coupler 14 in a driving direction related to a difference between a vertical position 28 of the coupler 14 in the position data and a height of the hitch ball 34.

Figure 2:
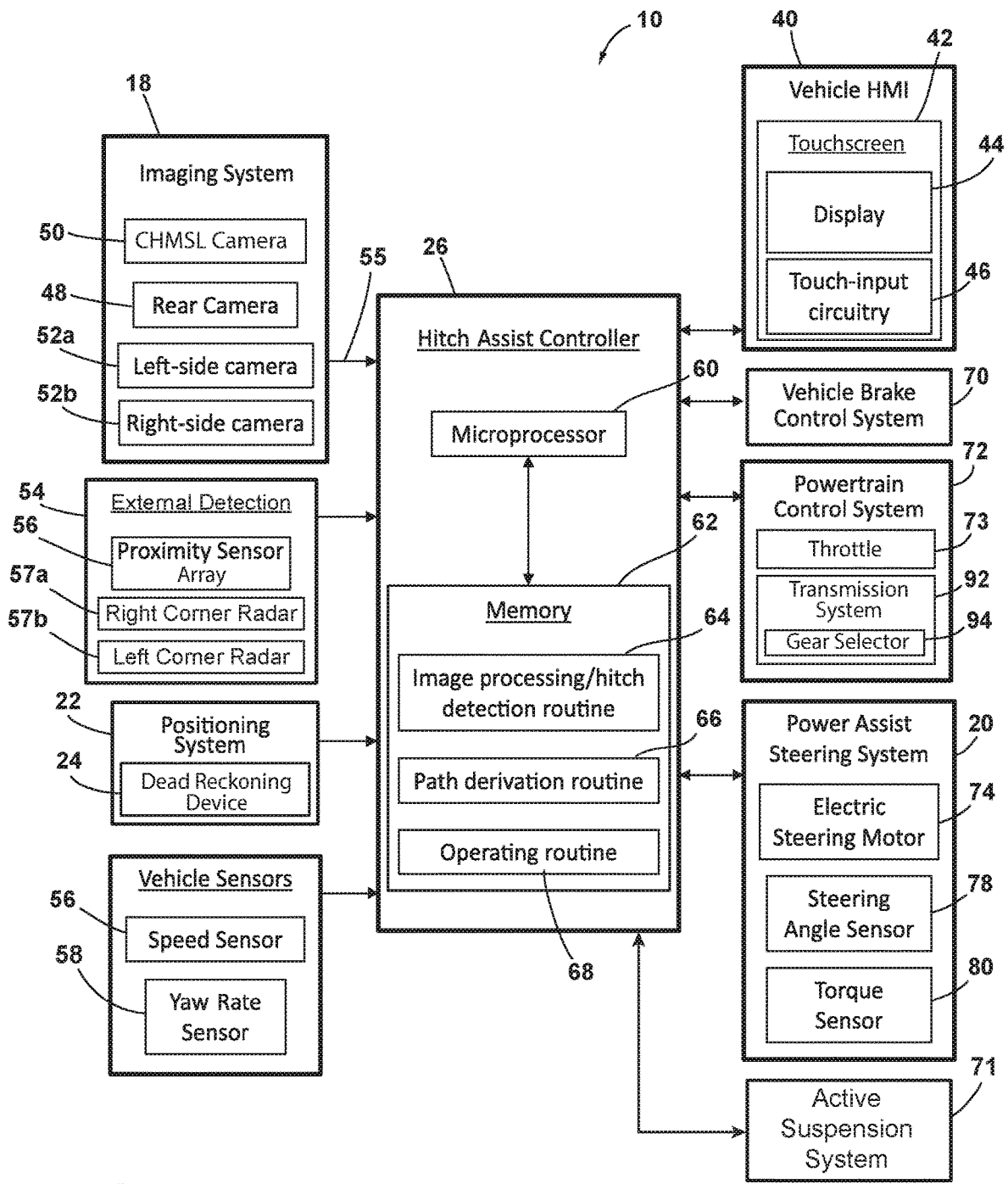
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle δ. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, a radar unit or radar units 57a,57b, and other vehicle sensors and devices may provide sensor signals or other information, such as sequential images of a trailer 16, including the detected coupler 14, that the controller 26 of the hitch assist system 10 may process with various routines to determine the height H and position (e.g., based on the distance $D_h$ and angle $\alpha_h$) of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command 69 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 may be provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 4:
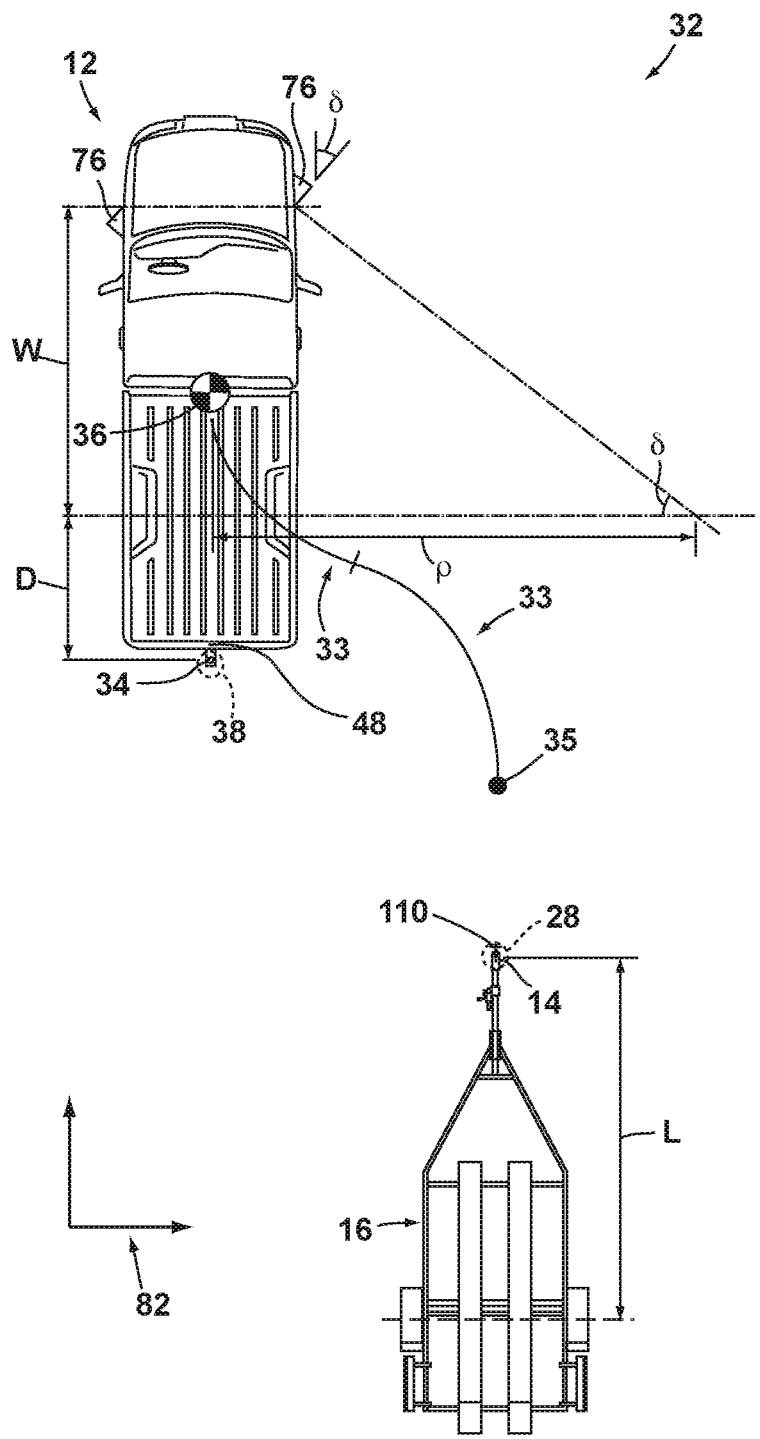
FIG. 4 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 4). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, as well as using one or more of the cameras 48,50,52a,52b to track the positions of identifiable ground items or portions over time. In some embodiments, individual wheel speeds can also be used to determine a vehicle yaw rate γ, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for a collision with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 4) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing 64 routine and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the detection routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing detection routine 64).

System 10 can also incorporate an imaging system 18 that includes one or more exterior cameras, which in the illustrated examples include rear camera 48, center high-mount stop light ("CMHSL") camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which in the depicted arrangement include fields of view 49, 51, 53a, and 53b to correspond with rear camera 48, CMHSL camera 50, and side-view cameras 52a and 52b, respectively. In this manner, image data 55 from two or more of the cameras can be combined in detection routine 64, or in another dedicated image processor within imaging system 18, into a single image. The detection routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36.

In a further aspect, controller 26 may also be in direct or indirect communication with the above-mentioned proximity sensor or array of proximity sensors 54 and one or more radar units, such as the rear-right 57a and rear-left 57b radar units. In various examples, the proximity sensors 54 may be utilized by other systems within vehicle 12, including backup alert systems, automated braking systems or the like, as may the radar units 57a,57b, including in connection with cross-traffic alert systems and the like. In this manner, controller 26 can communicate with such systems or with a centralized on-board computer or the like to obtain signals or data from the sensors 56 and radar units 57a,57b when present in the associated vehicle 12. In this manner, controller 26 may be able to receive data from either or both of the proximity sensors 54 and the radar units 57a,57b that can be used in combination with image data 55 as a supplement thereto or in a situational replacement for image data 55, when such data becomes unavailable. In one aspect, radar units 57a,57b may be less susceptible to diminished functionality due to weather than image data 55 and do not require any ambient light to function. In this manner, the radar units 57a,57b can augment or substitute image data 55 for trailer 16 or coupler 14 location when detection routine 64 cannot locate either trailer 16 or coupler 14. Accordingly, as discussed herein, the controller 26 may be configured to utilize the image data 55, as well as the data from sensor array 54 and radar units 57a,57b collectively in what is referred to herein as positioning data.

The detection routine 64 can be specifically programmed or otherwise configured to determine the position of trailer 16 and the associated coupler 14 relative to vehicle 12 using the position data, as best suited for the situation and conditions. In one aspect, the detection routine 64 can first attempt to identify any trailers 16 within the image data 55, which can be done based on stored or otherwise known visual characteristics of trailer 16, of an number of different types, sizes or configurations of trailers compatible with system 10, or trailers in general. When a trailer 16 is identified, controller 26 can seek confirmation from the user that the identification of the trailer 16 is accurate and is the correct trailer for which to complete an automated hitching operation, as described further below. After the trailer 16 is identified, controller 26 may then identify the coupler 14 of that trailer 16 within the image data 55 based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the location 28 of coupler 14 can be determined based on the marker location. Additionally or alternatively, controller 26 may seek confirmation of the determined coupler 14. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55.

Figure 3:
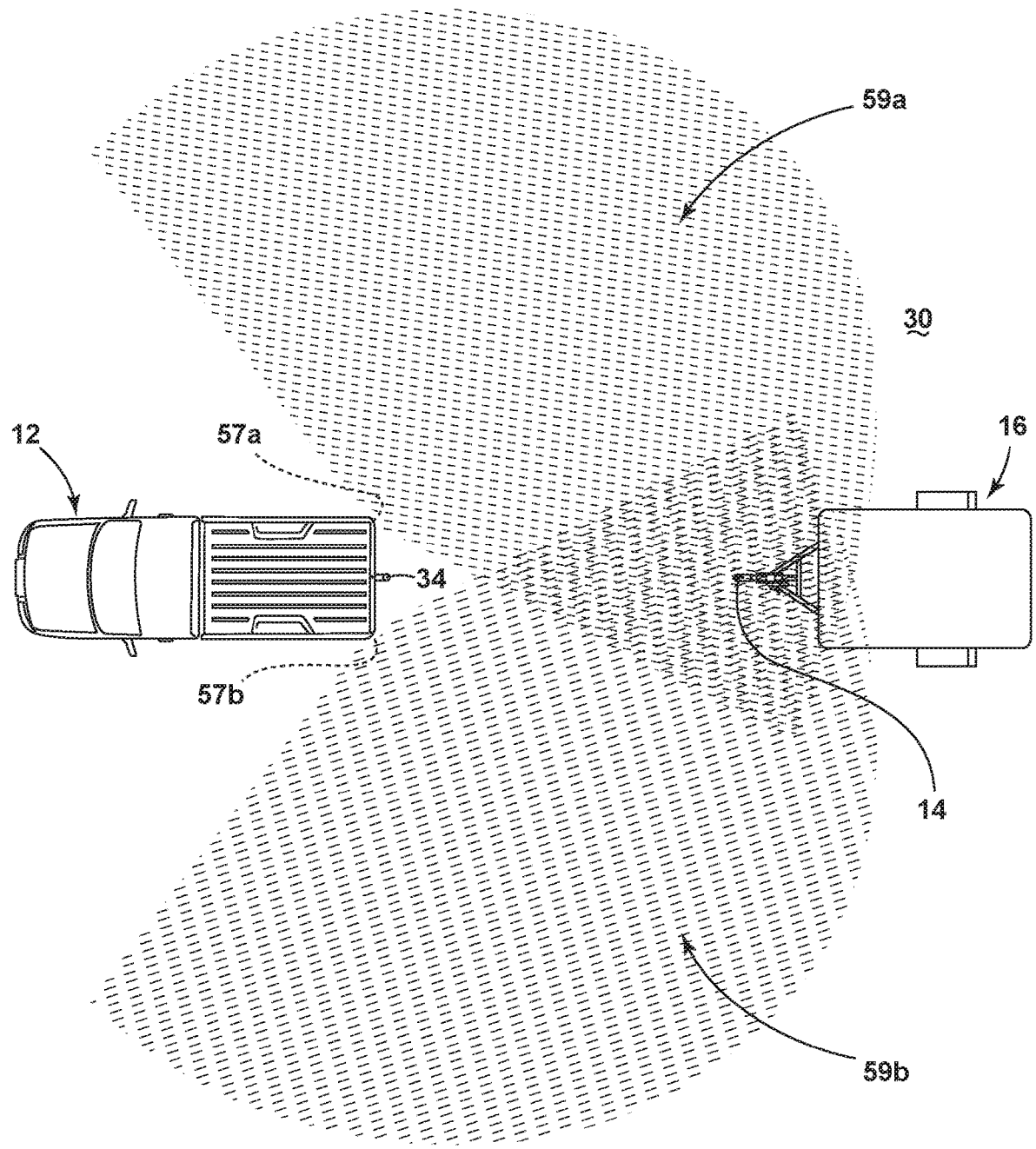
FIG. 3 is an overhead schematic view showing example coverage areas of radar units that may be included with the vehicle.

As discussed above, system 10 can be further configured to supplement the image data 55 with the additional information receivable from sensor array 54 and radar units 57a,57b, when the conditions and/or initial location of vehicle 12 relative to trailer 16 makes such information useful for detection routine 64. In one aspect, radar units, 57a,57b, as discussed above function without light and are less susceptible to diminished data resolution due to weather (e.g., snow or heavy rain). Further, radar units 57a,57b may exhibit improved accuracy at distance compared to camera 48, for example, making at least an initial identification of trailer 16 and a determination of a general location thereof for initial maneuvering possible using the data from radar units 57a,57b. As shown in FIG. 3, in one example, the placement and respective ranges 59a,59b of the respective radar units 57a,57b may result in an area of overlap in the location data obtained by radar units 57a,57b positioned directly behind vehicle 12 in an area beginning somewhat spaced hitch ball 34 and extending through the range of the radar units 57a,57b. Because of such overlap, the positioning data from radar units 57a,57b may be of additional use when the trailer 16 is within such an area relative to vehicle 12. Additionally, the positioning data from radar units 57a, 57b may be able to more accurately determine the height $H_c$ of coupler 14, which may be useful in determining if coupler 14 must be raised prior to completion of an automated hitching operation or if vehicle 12 can be lowered into a position wherein the hitch ball 34 is moveable beneath coupler 14, including in implementations of system 10 in a vehicle with an active and/or adjustable suspension system 71, as discussed further below. Similarly, the use of the positioning data from sensor array 54 does not require light, may be less susceptible to diminished resolution due to weather conditions, and captures an area around vehicle 12 not covered by radar units 57a,57b and that may, further, be out of view of camera 48. In this manner, image data 55 may be supplemented by the data from sensor array 54 when vehicle 12 is relatively close to trailer 16 (e.g., when hitch ball 34 is within 2 feet, 18 inches, or the like from coupler 14.

In various examples, controller 26 may initially rely on the identification of trailer 16 for the initial stages of an automated hitching operation (including from one or a combination of the image data 55 and the additional positioning data from radar units 57a,57b), with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 resulting in a change to the particular image within the data 55 that can improve the resolution or move the coupler 14 relative to the remaining portions of trailer 16 such that it can be more easily identified.

As shown in FIG. 4, the detection routine 64 and operating routine 68 may be used in conjunction with each other to determine the path 32 along which hitch assist system 10 can guide vehicle 12 to align hitch ball 34 and coupler 14 of trailer 16. In the example shown, an initial position of vehicle 12 relative to trailer 16 may be such that coupler 14 is only in the field of view 53a of side camera 52a, with vehicle 12 being positioned laterally from trailer 16 but with coupler 14 being almost longitudinally aligned with hitch ball 34. In this manner, upon initiation of hitch assist system 10, such as by user input on touchscreen 42, for example, detection routine 64 can identify coupler 14 within the image data 55 of camera 52a and estimate the position 28 of coupler 14 14 relative to hitch ball 34 using the image data 55 in accordance with one of the example discussed above (or a combination of the two examples) or by other known means, including by receiving focal length information within image data 55 to determine a distance $D_c$ to coupler 14 and an angle $\alpha_c$ of offset between coupler 14 and the longitudinal axis of vehicle 12. This information can then be used in light of the position 28 of coupler 14 within the field of view of the image data 55 to determine or estimate the height $H_c$ of coupler 14. Once the positioning $D_c,\alpha_c$ of coupler 14 has been determined and, optionally, confirmed by the user, controller 26 can take control of at least the vehicle steering system 20 to control the movement of vehicle 12 along the desired path 32 to align the vehicle hitch ball 34 with coupler 14.

Continuing with reference to FIG. 4 with additional reference to FIG. 2, controller 26, having estimated the positioning $D_c,\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as the drawbar length L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta}, \quad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}. \quad (2)$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a rearward distance to coupler 14 and derive a path 32 that achieves the needed lateral and backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. In further aspects, system 10 can be further configured to shift vehicle 12 between forward-driving gears and the reverse driving gear such that the derivation of path 32 can include both forward and rearward driving of vehicle 12 to achieve the desired lateral movement, as described further in co-pending, commonly-assigned U.S. patent application Ser. No. 15/583,014, the entire contents of which are incorporated by reference herein.

Figure 5:
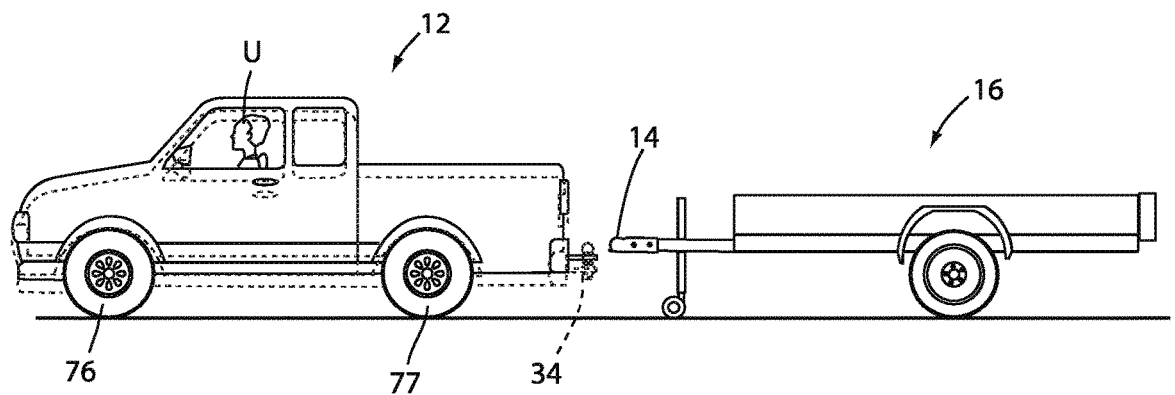
FIG. 5 is a side schematic view showing a vehicle in a hitching operation with a trailer in which downward movement of the vehicle hitch ball may facilitate alignment between the hitch ball and a coupler of the trailer.
Figure 6:
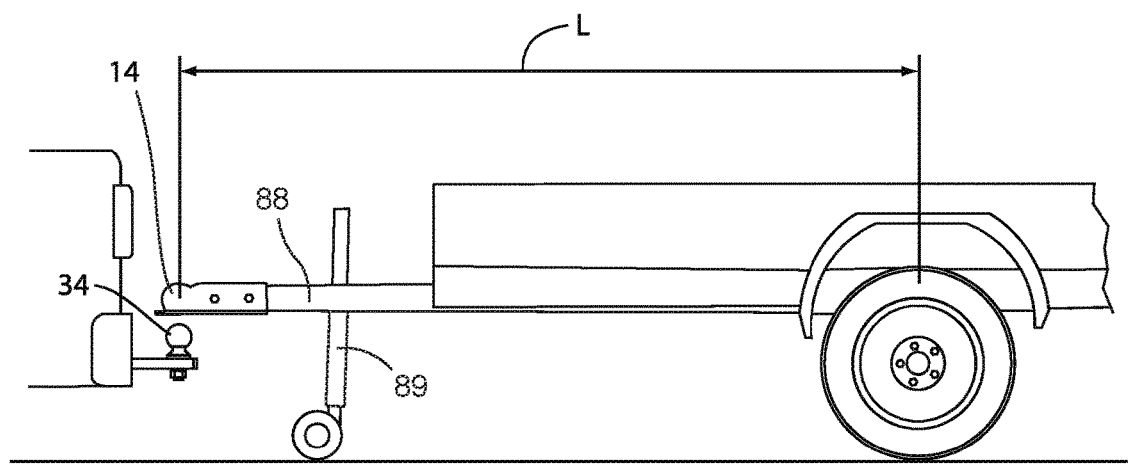
FIG. 6 is a side view showing the rear of the vehicle in a lowered position to move the hitch ball into alignment with the coupler.

As discussed above, path derivation routine 66 can determine the endpoint 35 of path 32 to achieve a desired alignment between hitch ball 34 and coupler 14. In this manner, as shown in FIGS. 5 and 6, the position hitch ball 34 desired for alignment with hitch ball 34 is such that, in one example, the trailer tongue 88 can be lowered, for example by tongue jack 89 (which may be powered or manual) to, correspondingly lower coupler 14 onto hitch ball 34 for engagement therewith. In this manner, it is understood that, in an arrangement similar to that used in un-assisted hitching of a trailer 16 to a vehicle 12, coupler 14 is to be in an elevated position above the ground surface on which it is positioned at a height $H_c$ that is higher than the height $H_b$ of the hitch ball 34 such that the reversing of vehicle 12 along path 32 brings hitch ball 34 beneath coupler 14 so that coupler 14 can be lowered onto hitch ball 34. Alternatively, when system 10 is present within a vehicle with an active suspension system 71 that is configured to raise and lower the ride height of vehicle 12 (i.e. the height at which the chassis/body of vehicle 12 is supported above the ground 30 on the wheels by the suspension system 71), system 10 may communicate with the suspension system 71 to direct the suspension system 71 to lower the height of vehicle 12 to position the hitch ball 34 at a height $H_b$, lower than the height $H_c$ of coupler 34. In this manner, controller 26 can include information regarding the position of the top of hitch ball 34, for example, such that the ride height of the vehicle 12, which is tracked by the suspension system 71, for example, can be correlated with the height $H_b$ of hitch ball 34. In such an example, the geometric information regarding hitch ball 34 and the associated mount (along with other hitch balls and mounts used with the particular vehicle 12) can be stored in the memory 62 accessible to controller 26 for retrieval in connection with such functionality. In another example, hitch ball 34 may be visible to camera 48, for example, such that the position thereof can be compared to the position of coupler 14 in image data 55, allowing system 26 to determine if hitch ball 34 is lower than coupler 14 (including by a predetermined clearance distance) and cause suspension system 71 to lower vehicle 12, as needed, until such a condition is met, including without determining the height $H_b$ of hitch ball 34. In various examples, the suspension system 71 may be configured to lower only the rear of vehicle (e.g., where hitch ball 34 is positioned) or may lower vehicle 12 in its entirety, which similarly causes the hitch ball 34 to lower. Additionally, system 10 may be configured to alert the driver and at least temporarily stop the automated hitching process if the suspension system 71 is at its lower limit (i.e., with hitch ball 34 at its lowest position), but the height $H_b$ of hitch ball 34 is still not lower than the height 14 of coupler $H_c$, particularly by an amount that would allow hitch ball 34 to move under coupler 14.

In various examples, controller 26, having determined the position, particularly $D_c$ and $\alpha_c$ of coupler 14 relative to vehicle 12, can proceed in backing vehicle 12 toward trailer 16 at whatever vehicle 12 height the suspension system 71 was set to prior to activation of system 10 until such a point that controller 26 can determine the height $H_c$ of coupler 14, such as with imaging data 55 or the additional positioning data provided by radar units 57a,57b, for example. When the coupler height $H_c$ can be determined, controller 26 may, for example, communicate with brake system 70 to cause vehicle 12 to stop before causing suspension system 71 to lower vehicle 12 to position the hitch ball 34 at a height $H_b$ lower that the height $H_c$ of the coupler 14. When such positioning has been achieved, controller 26 can control the brake system 70 and/or the powertrain system 72 to continue backing vehicle 12 until hitch ball 34 is aligned with coupler 14. In an example when the positioning data from radar unit 57a,57b is used to determine the height $H_c$ of coupler 34, controller 26 may direct the suspension system 71 to lower vehicle 12 when coupler 14 is at the closest position with respect to vehicle 12 while still being within the ranges 59a,59b of both radar unis 57a,57b, which may for example be in a position $D_c$ of between 5 and 10 feet, for example, and/or a corresponding position ac of between about 0° and 15° to either the left or right. In an example wherein image data 55 is used to determine the height $H_c$ of coupler, such a lowering point may be closer to trailer 16, such as when the position $D_c$ of trailer 16 relative to vehicle 12 is within 2 feet, for example.

Figure 7:
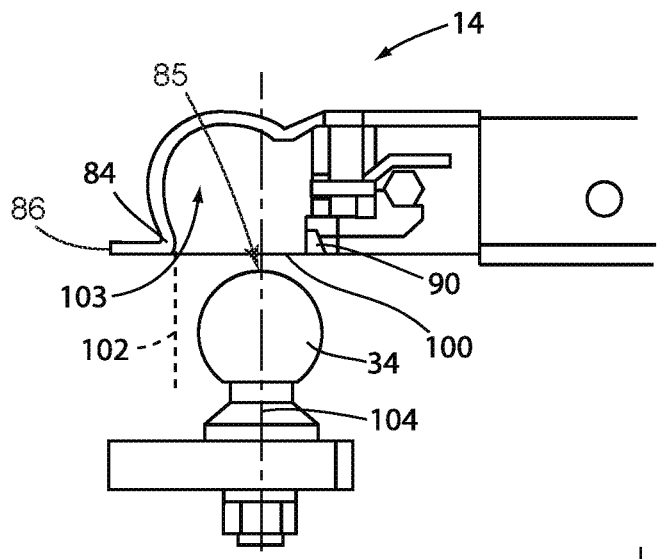
FIG. 7 is a partial cross-section detail view of the vehicle hitch ball positioned beneath the coupler.
Figure 8:
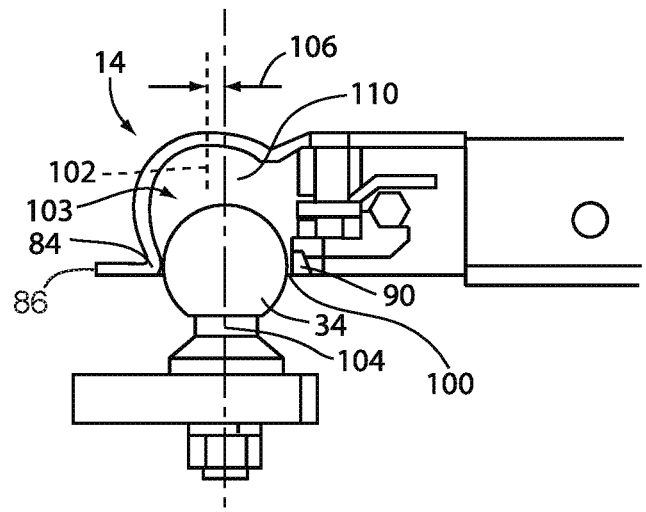
FIG. 8 is a detail view showing the hitch ball being moved upward into an interior of the coupler.
Figure 9:
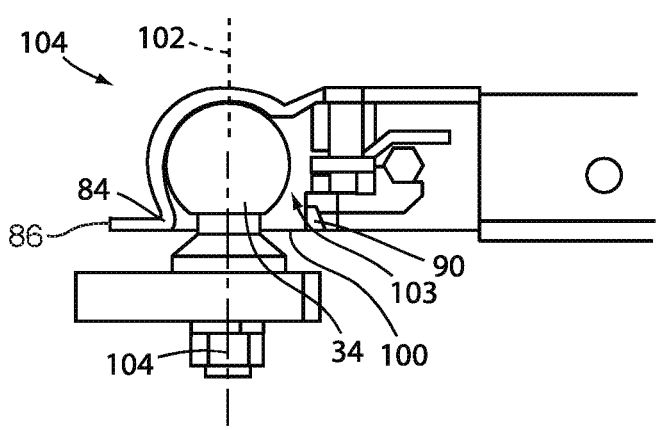
FIG. 9 is a detail view showing the hitch ball in an engaged position with the coupler.

As shown in FIGS. 7-9, as vehicle 12 approaches trailer 16 after lowering of hitch ball by way of suspension system 71, system continues reversing of vehicle 12 by controlling at least one of the brake system 70 and the powertrain system 72 such that hitch ball 34 moves beneath coupler 14. As mentioned above, the exact vertical positioning of hitch ball 34 can vary, including by the manner in which the heights of coupler 14 and hitch ball 34 are tracked and determined. In one example, controller 26 may be able to use the position data to determine the position of the top 35 of hitch ball 34, as well as of a leading portion 86 of coupler 14, with those features being the relevant features for mutual clearance of hitch ball 34 and coupler 14. In such a case, the determined height $H_b$ of hitch ball 34 can be lowered to a position relatively close to the height $H_c$ of coupler 14, including by a clearance distance 89 equal to approximately an estimated potential error of the measurements and/or an allowance for uneven ground conditions or vehicle bounce during movement (such distance being potentially between 0.5 and 2 inches). When proper alignment of hitch ball 34 and coupler 14 has been determined, as discussed further below, controller 26 can cause suspension system 71 to raise the vehicle 12 ride height to bring hitch ball 34 into an engaged position with coupler 14. At least in the illustrated example, wherein the tongue 88 of trailer 16 is supported by a jack 89, the jack 89 may have to be retracted prior to driving vehicle 12. Additionally, the coupler 14 may include a latch 90 that must be engaged with hitch ball 34, as discussed further below, by a manual operation prior to driving vehicle 12. In this manner, it may be advantageous or desired to stop raising hitch ball 34 by way of suspension system 71 as soon as hitch ball 34 is engaged with coupler 14, without lifting coupler 14 and, accordingly tongue 88 by a significant amount (e.g., at least less than about 1 inch and, in some aspects less than about 0.5 inches).

Figure 10:
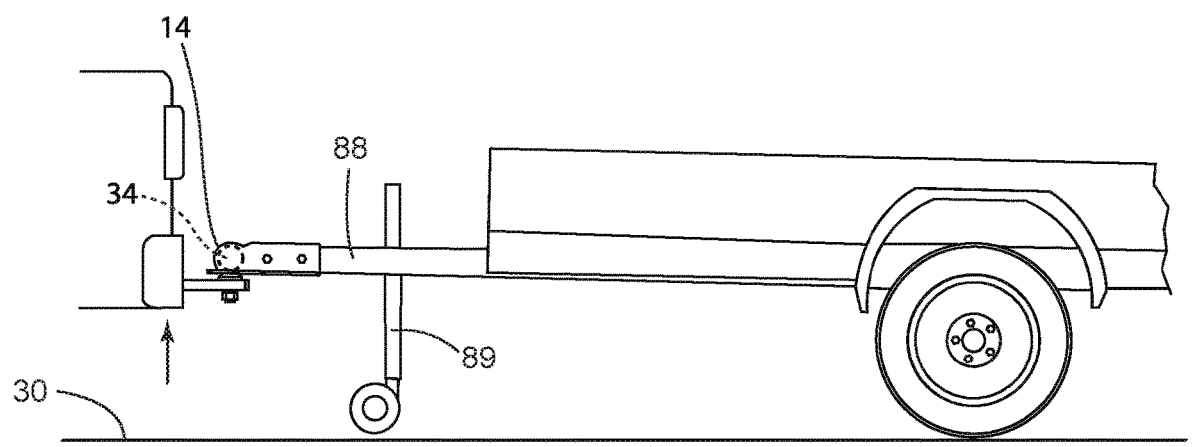
FIG. 10 is a side view showing the rear of the vehicle in a raised position in which the hitch ball is engaged with the coupler.

In the present example, wherein suspension system 71 is adjustable, suspension system 71 will generally be operable to lift vehicle 12, regardless of the particular mechanism by which suspension system 71 operates to adjust the ride height, by drawing power from vehicle 12 (i.e. by drawing current from the vehicle battery). The amount of power drawn by the suspension system 71 is influenced by the vehicle weight and load on suspension system 71, even when accounting for the compression and extension of any springs included in the suspension system 71. In this manner, controller 26 can be configured, by way of the communication with suspension system 71 or otherwise, to monitor the power being drawn by the suspension system 71 when vehicle 12 is being raised to engage hitch ball 34 with coupler 14. In this manner, an increase in the power draw of suspension system 71, beyond any additional power increase by extension of the suspension springs, can be used to determine that hitch ball 34 is lifting coupler 14 and is supporting the tongue weight of trailer 16. Controller 26 can make such a determination in number of ways, including by monitoring the current draw of one or more actuators within the suspension system 71 and integrating the measurement data during raising of the suspension system 71 at the direction of controller 26. System 26 can then monitor the result of the power draw integral for an increase above a threshold value, indicating a sudden increase in the power draw attributable to vehicle 12 beginning to raise the coupler 14. When such a condition is met, controller 26 can assume that coupler 14 is seated on hitch ball 34 and can direct suspension system 71 to stop raising the vehicle ride height and cause suspension system 71 to maintain the present height, as shown in FIG. 10. At such a point, system 10 can direct the driver (including by way of a message on HMI 40) to secure trailer 16 and stow the jack 89 before proceeding. System 10 can wait for the user to indicate (also through HMI 40, for example) that such actions have been completed before returning the vehicle height to its original value by a command to suspension system 71, for example, before returning control of vehicle 12 to the user for towing trailer 16. Controller 26 can also be configured to alert the user when suspension system 71 has reached a maximum height before the power draw indicates engagement of hitch ball 34 with coupler 14. In such an instance, the user may have to manually lower the tongue 88 of trailer 16 to seat coupler 14 on hitch ball 34, which may be indicated to the user by system 10, including by way of vehicle HMI 40.

As also shown in FIGS. 7-9, it is common for couplers 14 to include an undercut 84 that extends backward relative to the leading portion 86 of coupler 14. The undercut 84 is present to extend around the underside of hitch ball 34 such that hitch ball 34 can be captured within coupler 14. This arrangement helps to prevent coupler 14 from coming dislodged from hitch ball 34 during driving, such as during driving on a bumpy or uneven surface. To further capture hitch ball 34, coupler 14 may include a latch 90 opposite undercut 84. Latch 90 is configured with a portion thereof that selectively extends toward undercut 84 under a portion of hitch ball 34 opposite undercut 84 to secure hitch ball 34 within coupler 14. In a similar manner latch 90 can be withdrawn from under hitch ball 34 to allow coupler 14 to be lifted off of hitch ball 34. In such an arrangement, the retreating movement of latch 90 is such that the opening 100 on the lower face of coupler 14 is set back from the centerline defined by the internal shape of coupler 14. As can be seen in FIGS. 7-9, the shape of the interior 104 of coupler 14 is shaped to match that of hitch ball 34 along a cross-sectional profile extending along the longitudinal axis of vehicle 12. In this manner, the shape of coupler 14, in which the external shape generally follows that of interior 103, defines centerline 102 that, when coupled with hitch ball 34, as shown in FIG. 9, aligns with the centerline/axis 104 of hitch ball 34. However, due to the rearwardly-positioned center 100 of opening, which is set back from the centerline 102 of coupler 14, direct alignment of the centerline 102 of coupler 14 with the axis 104 of hitch ball 34 when coupler 14 is lowered onto hitch ball 34 can result in undercut 84 contacting the upper face of hitch ball 34 and causing an interference with the assembly of coupler 14 onto hitch ball 34.

As can be appreciated, to lower coupler 14 onto hitch ball 34, hitch ball 34 should be positioned such that its axis 104 is positioned behind the centerline 102 of coupler such that the forward-most point of hitch ball (defined generally along the diameter thereof) is positioned behind the undercut 84 and, overall, such that hitch ball 34 is aligned with opening 100. If vehicle 12 is brought to a position in which the axis of hitch ball 34 is aligned directly or closely with the centerline 102 of coupler 14, then either or both of vehicle 12 and trailer 16 will have to be manually moved to allow undercut 84 to move past the front edge of hitch ball 34. In such an instance, the trailer 16 must be moved against its weight and vehicle may have to be moved by further reversing, or rocked slightly backwards against the force of the park gear and/or parking brake, which may prove difficult. In use of embodiments of the above-described system 10 in executing a reversing operation of vehicle 12 to align hitch ball 34 with coupler 14 for attachment therebetween by lowering of coupler 14 onto hitch ball, criteria by which a hitching operation is deemed successful may minimize manual intervention, including by manual moving of trailer 16 or forcing of coupler 14 into engagement with hitch ball 34 resulting in movement of vehicle 12 and or trailer 16.

Accordingly, system 10, as presently described provides desired alignment between hitch ball 34 and coupler 14, as described above by configuring controller 26 to acquire data relating to the position 28 for coupler 14 of trailer 16 and deriving vehicle path 32 to position the center/axis 104 of a hitch ball 34 of the vehicle 12 at an interference offset 106 past the centerpoint (or centerline) 102 of the coupler 14 in a driving direction 108 associated with the vehicle path 32. As discussed above the controller 26 then and outputs commands in the form of control signals to at least the steering system 20 to maintain the vehicle along the path 32. In general the driving direction 108 may not directly correspond with the exact direction of path 32 but may be more generally considered as a reversing direction of vehicle 12. To that end, the interference offset 106 can be applied to essentially move the endpoint 35 of path 32 rearward of the centerline 102 of coupler to a position 110 more likely to be centrally aligned with opening 100. In this manner, the interference between undercut 84 and hitch ball 34 is removed (or at least greatly reduced) without introducing additional interference between hitch ball 34 and other portions of coupler 14 (including latch 90 or other portions of opening 100). Accordingly, the interference offset 106 may be applied along an axis of the trailer 16 (i.e. laterally aligned with the centerline 102 of coupler 14 in a direction toward the axle of trailer 16.

The application of interference offset 106 is preferred in the present application of system 10 to an attempt to determine the center position 110 of opening 100 directly, as determining the particular geometry of coupler 14 may be difficult. In one example, as shown in FIGS. 8 and 9, the data indicating the position 28 of coupler 14 may include data corresponding with a leading edge 112 of the coupler 14, which may be the easiest portion of coupler 14 to detect using available image data 55 or the data received from proximity sensors 54. Any exact determination of the undercut 84 geometry, including the distance by which it extends rearward relative to leading edge 112, may be difficult using such data. System 10, however, may be able to determine the centerline 102 of coupler 14 using the available data. In an example, system 10 may be able to determine the distance $D_c$ to the coupler and a width 114 of the coupler 14 within the image data 51 (i.e. the lateral area of coupler 14 within the image). In this manner, the distance $D_c$ to the coupler 14 and the width 114 of the coupler 14 can be used to determine the centerline 102 position of the coupler 14. In one example, the distance $D_c$ data and the width 114 data within the image 51 can be used to determine the size of coupler 14 by correlating the image width data 114 with the actual size of coupler 14 based on the distance. Because the interior 103 is generally spherical, with the visible portion of the coupler 14 generally matching the interior profile, the distance between the leading edge 112 and the centerline 102 will be approximately equal to half of the width of coupler 14, with such distance being added to the detected distance $D_c$ to the leading edge 112 to determine the centerline 102 position.

In one application of system 10, the interference offset 106 may be a preset system parameter that can essentially be added to the centerline 102 position in the driving direction 108 to achieve the desired endpoint 35 location for path 32 to align coupler 14 with hitch ball 34 as shown in FIG. 8. By way of example, the preset interference offset 106 may correspond with an average undercut 84 size within an array of couplers 14 on trailers within the towing limits of the particular vehicle 12. In general, such a preset may vary from between about ⅛" to about ½". In further, applications, system 10 may include various different interference offset 106 values stored in memory, which may be scaled to correspond with various widths 114 or categories thereof, which may accordingly, be selected based on the coupler 14 width 114 determination. Further, system 10 may be configured to allow a user to adjust the interference offset 106 (or various selections thereof), including by way of HMI 40. In yet another implementation, controller 26 can continue to receive information from cameras 48,50,52a,52b and/or proximity sensors 54 to determine if trailer 16 is moved after the hitching operation is complete, which can indicate that the hitching operation did not achieve proper alignment of hitch ball axis 104 with the adjusted position 110. Such information can include the distance by which the final position of hitch ball axis 104 was misaligned by determining the closest subsequent position of coupler 14 relative to the vehicle 12 during coupling (indicating the proper position for hitch ball axis 104 for alignment with the adjusted position 110, as well as the position of centerline 102 of coupler 114, based on the final position of coupler 14. System 10 can then use such data to adjust the interference offset 106 to achieve more optimal alignment in a subsequent hitching operation.

Figure 13:
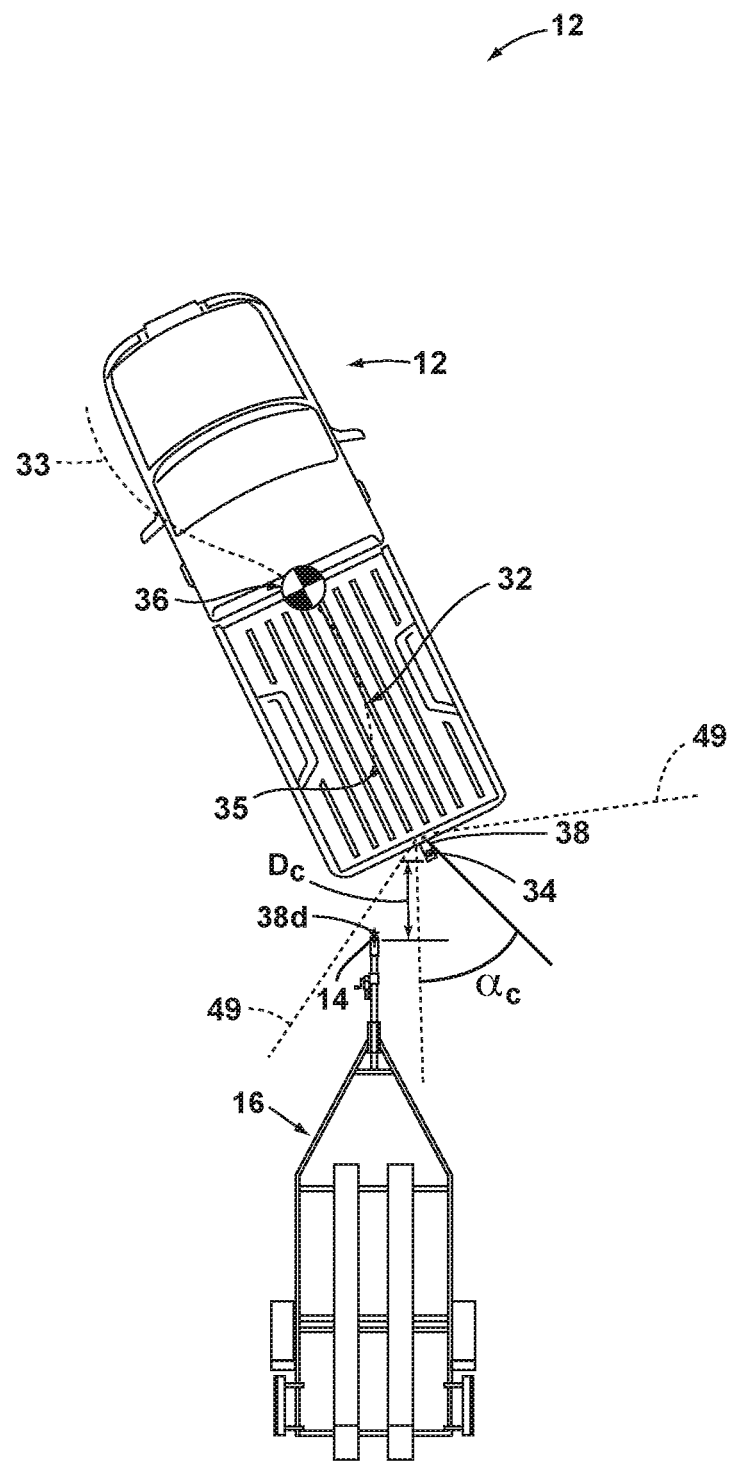
FIG. 13 is an overhead schematic view of the vehicle during a subsequent step of the alignment sequence with the trailer.

As shown in FIGS. 11-14, once the path 32 including the determination of endpoint 35 taking into account the desired interference offset 106 has been determined, system 10 controls the reversing of vehicle 12 toward trailer 16 to bring hitch ball 34 closer to alignment with the desired offset position 28. As vehicle 12 approaches trailer 16, the accuracy of the data relating to the position 28 of coupler 14 may increase, such as by providing clearer image data including coupler 14 by cameras 48,50,52a,52b or radar units 57a,57b, and/or by bringing vehicle 12 to a position wherein the proximity sensors 54 can be used to detect the position 28 of coupler 14. In this manner, path routine 66 can continue to operate as vehicle 12 maneuvers along path 32 such that a remaining portion of path 32 (such as the portion of path 32 shown in FIG. 13 compared with the initial path of FIG. 11) can be re-iterated or refined based on the updated position 28 data. As can be appreciated, this can be done continuously or once the vehicle 12 reaches a threshold distance $D_c$ to coupler 14 wherein the proximity sensors 54 can be used. The re-iterated or refined path 32 can include a re-iterated or refined determination of the centerline 102 of coupler 14, which can be used to determine the desired adjusted position 110 for hitch ball axis 104 and the endpoint 35 of path 32 that corresponds therewith, based on the desired interference offset 106, which may be selected or determined by any of the above-discussed processes.

Figure 14:
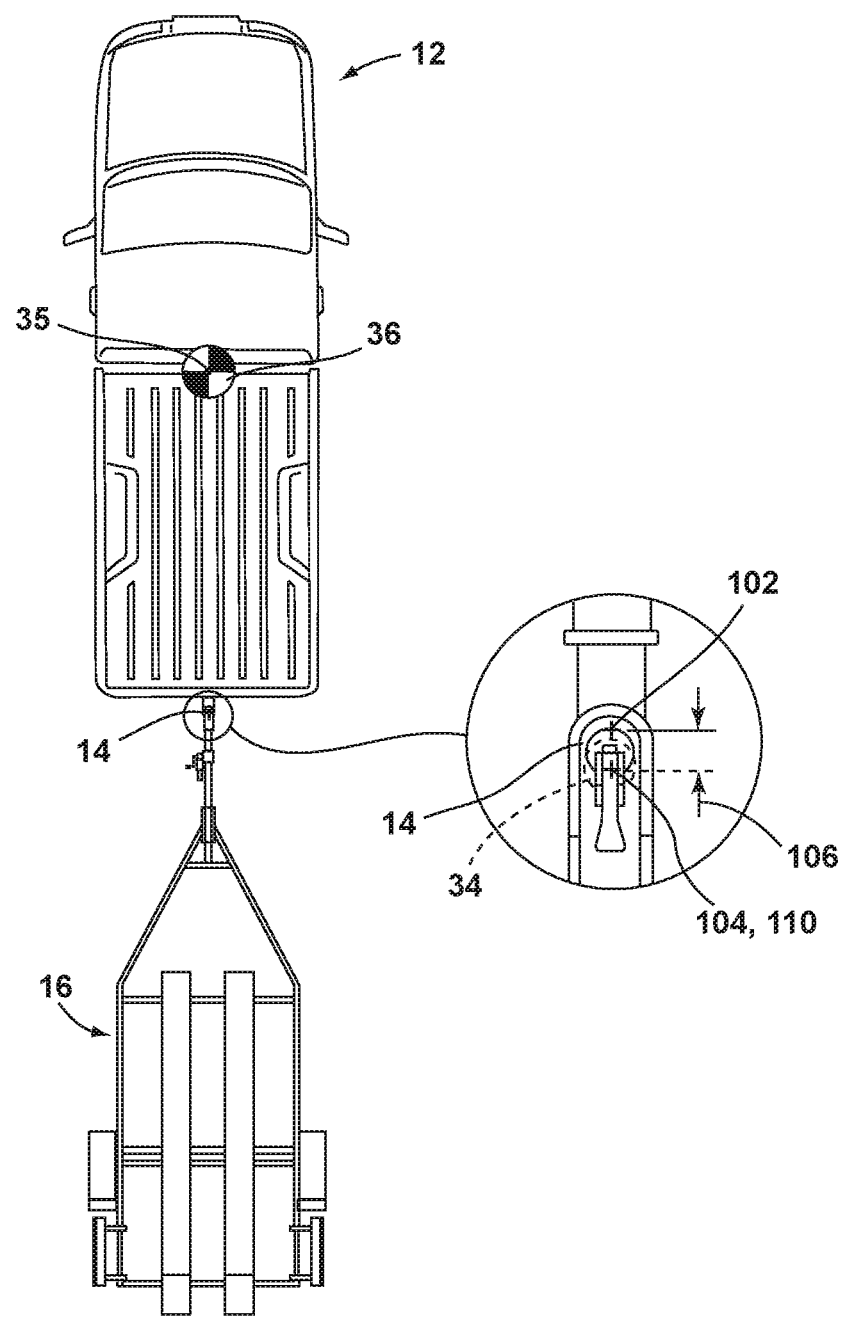
FIG. 14 is an overhead schematic view of the vehicle during a subsequent step of the alignment sequence with the trailer and showing the position of a hitch ball of the vehicle at an end of a derived alignment path.

The above-described determination of the adjusted position 110 of hitch ball axis 104 based on interference offset 106 can be particularly useful in an implementation of system 10 that is configured to output a brake control signal to brake system 70, as discussed above, wherein system 10 can slow vehicle 12 to a stop at the desired endpoint 35 of path 32. In such an implementation, controller 26 can determine path 32 and endpoint 35, as discussed above, and can control the steering and braking of vehicle 12 (and, further optionally, the powertrain system 72) to control movement of vehicle 12 along path 32 to bring vehicle 12 to endpoint 35 of path 32 in the desired orientation of alignment of the axis 104 of hitch ball 34 with the adjusted position 110, as shown in FIG. 14. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupler 14 to converge the known relative position of hitch ball 34 to the desired position 110 thereof relative to the tracked position 28 of coupler 14, as discussed above and shown in FIG. 14.

Figure 11:
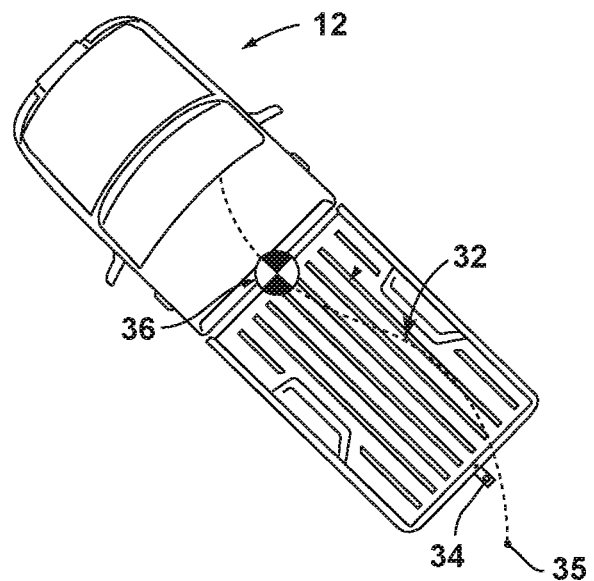
FIG. 11 is an overhead schematic view of the vehicle during a subsequent step of the alignment sequence with the trailer.
Figure 11:
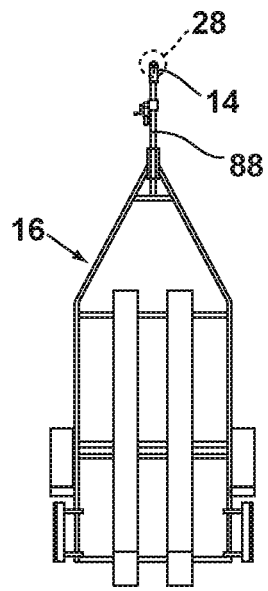
Figure 12:
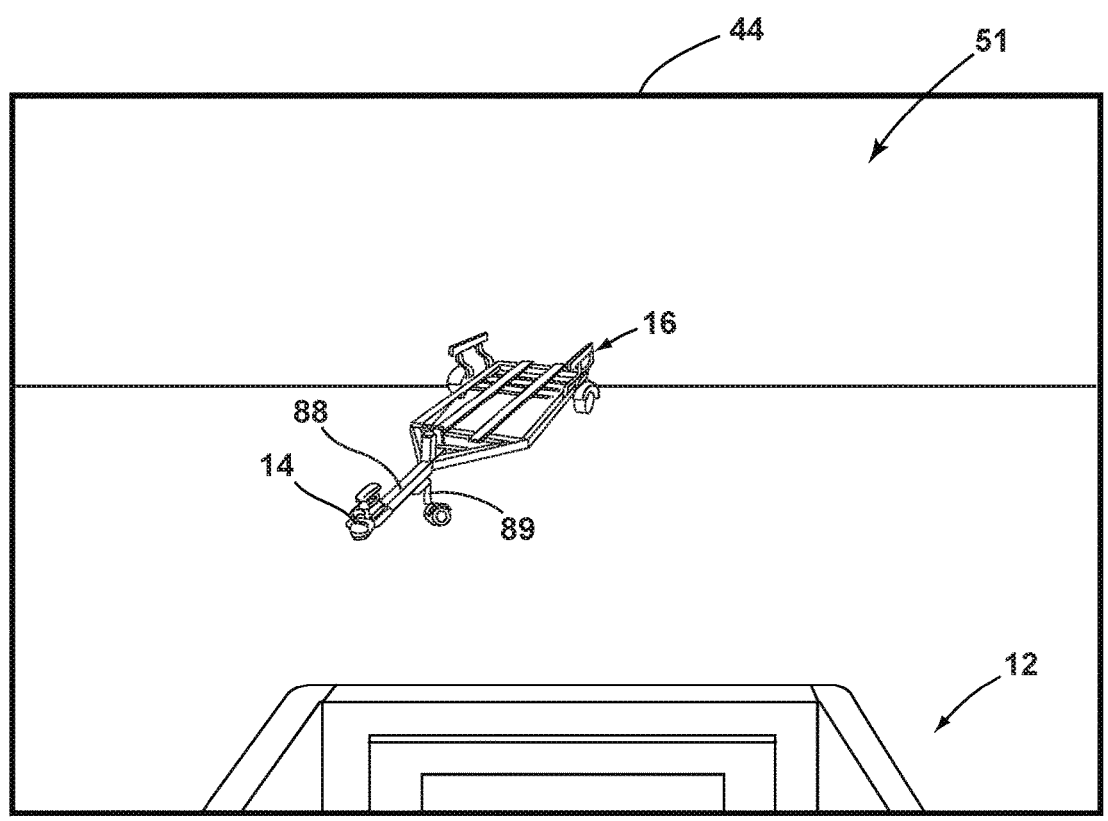
FIG. 12 is a depiction of an image received from a vehicle camera during the alignment sequence step of FIG. 11.

As discussed above, hitch assist system 10 can provide image data 55 to detection routine 64 that can be used by detection routine 64 (by the process described above or by other available processes) to determine the position of hitch ball 34 relative to vehicle 12 (i.e. to determine the particular drawbar length L for a given hitch ball 34 and corresponding mount). Additionally or alternatively, hitch assist system 10 can have stored in memory 62 or can otherwise determine the position of hitch ball 34. In one example, during an initial setup routine for hitch assist system 10, a user can be prompted to install hitch ball 34 by way of assembling a ball mount including hitch ball 34 with a receiver positioned on the rear of vehicle 12. The user can then be asked to measure the distance between of the hitch ball 34 and the vehicle bumper (the position of which can be pre-stored in memory 62) and to enter that measurement into memory 62 by way of HMI 40, for example. The user can also be prompted to enter the diameter of the particular hitch ball, which can be used in combination with the distance information to determine the location of hitch ball axis 104. In this manner, a number of different measurements for a plurality of hitch balls 34 used in connection with the particular vehicle 12 can be stored in memory 62 and can be selected by the user. In another example, hitch ball 34 may be within the field of view 49 of rear camera 48, as shown in FIG. 11, such that the available positioning data can be processed to determine the position of hitch ball 34 on a real-time or on-demand basis.

Figure 15:
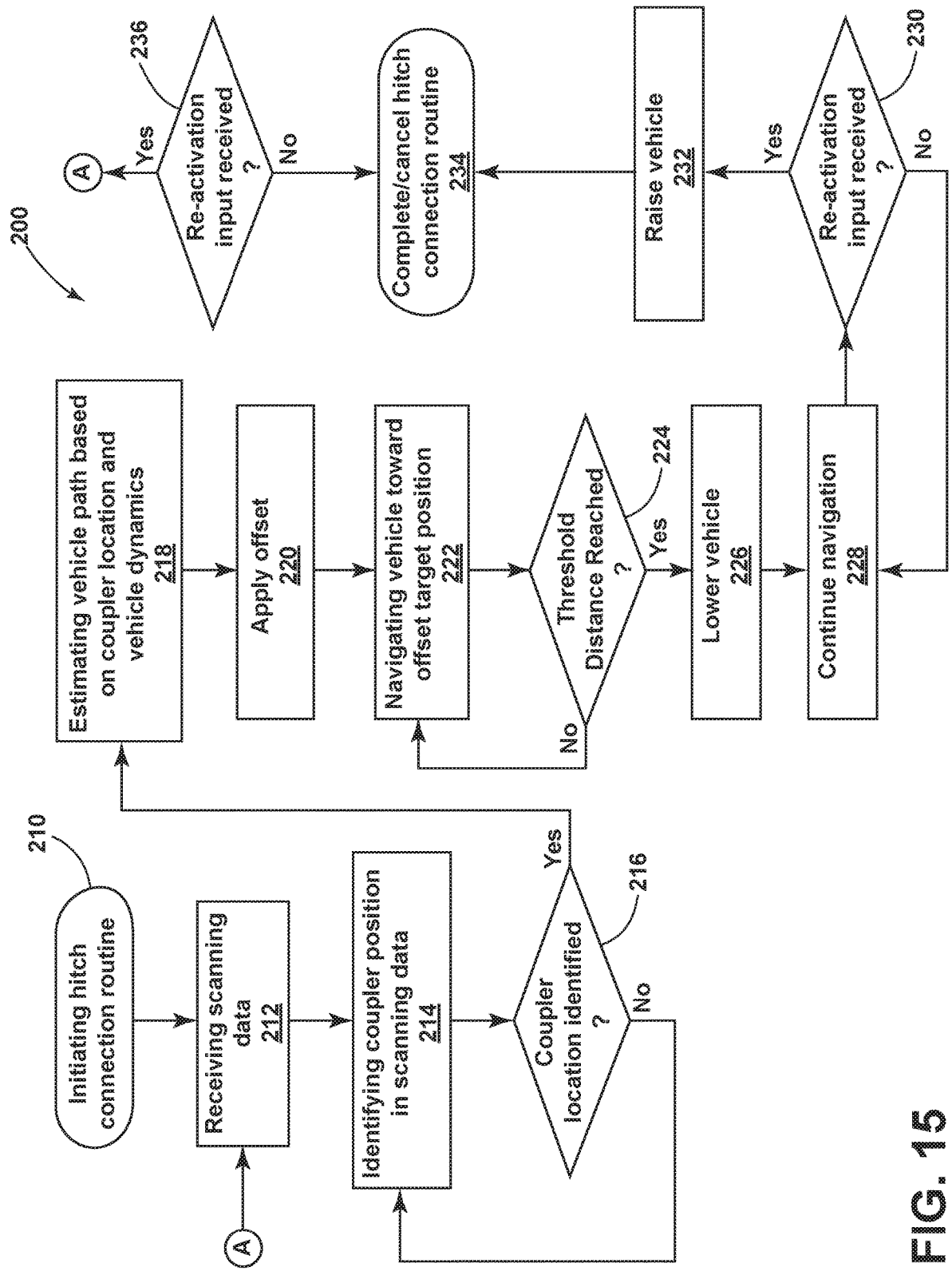
FIG. 15 is a flowchart depicting steps in the alignment sequence.

Turning now to FIG. 15, a flowchart showing steps in a method 200 for using hitch assist system 10 to align a vehicle hitch ball 34 with a trailer coupler 14 is shown. In particular, in step 210, the hitch assist system 10 is initiated. In an example, hitch assist system 10 can be initiated at any point when coupler 14 is in the field of view 49, 51, 53a, 53b of at least one camera 48, 50, 52a, 52b within imaging system 18 or is within range of one or both radar units 57a,57b. Accordingly, once the hitch assist system 10 is initiated, controller 26 can use imaging system 18 to scan the viewable scene using any or all available cameras 48, 50, 52a, 52b, as well as to receive data, if available, radar units 57a,57b from proximity sensors 54 (step 212). The scene scan (step 212) can be used to then identify the centerline 102 coupler 14 and, optionally, the associated trailer (step 214), which may be confirmed by the user (step 216). The distance $D_c$, and offset angle $\alpha_c$ of coupler 14, as identified in step 214, can then be determined using the available image data 55 (step 218) as discussed above, including using detection routine 64. As discussed above, detection routine 64 can be programmed or otherwise configured to identify coupler 14 of trailer 16 within the available position data (step 214). In this manner, after the results of the initial scene scan (step 212) are analyzed, controller 26 can determine if coupler 14 has been confirmed by the user (such as by way of HMI 40) in step 214. If coupler 14 has not been confirmed or if a determined coupler 14 has been rejected, the scene scan (step 212) can be continued, including while instructing driver to move vehicle 12 to better align with trailer 16, until coupler 14 is identified. When coupler 14 has been identified and confirmed, the path derivation routine 66 can be used to determine the vehicle path 32 to align hitch ball 34 with coupler 14 in step 218. In this manner, the positioning $D_h$, $\alpha_h$ of coupler 14 is used to place the coupler 14 within the stored data relating the image coordinates with the real-world coordinates of the area surrounding vehicle 12. After the initial path derivation 218, the interference offset 106 is optionally selected (as discussed above) and applied (step 220) to the path 32 to adjust the endpoint 35 of path 32 to align the axis 104 of hitch ball 34 with the adjusted position 110 for assembly with coupler 14, as discussed above.

Once the path 32 has been derived, hitch assist system 10 can ask the user to relinquish control of at least the steering wheel of vehicle 12 (and, optionally, the throttle 73 and brake, in the implementation of hitch assist system 10 described above wherein controller 26 assumes control of powertrain control system 72 and brake control system 70 during execution of operating routine 68) (step 222). When it has been confirmed that user is not attempting to control steering system 20 (for example, using torque sensor 80, as discussed above), controller 26 begins to move vehicle 12 along the determined path 32. Hitch assist system 10 then controls steering system 20 to maintain vehicle 12 along path 32 as either user U or controller 26 controls the velocity of vehicle 12 using powertrain control system 72 and braking control system 70. As discussed above, controller 26 or the user can control at least steering system 20, while tracking the position $D_c$, $\alpha_c$ of coupler 14 (step 224) until vehicle 12 reaches a threshold distance for lowering of hitch ball 34 below coupler 14 (step 226). At that point, controller 26 can obtain or refine the position determination of coupler 14 to obtain the height $H_c$ thereof and can cause suspension system 71 to lower vehicle 12, as discussed above. When the desired height of hitch ball 34 has been achieved, controller 26 can continue backing vehicle 12 along path 32 (step 228) until vehicle 12 reaches endpoint 35, wherein the vehicle 12 hitch ball 34 reaches the desired position 110 for the desired alignment with coupler 14 (step 230), at which point controller 26 can cause suspension system 71 to raise vehicle 12, as discussed above to seat coupler 14 on hitch ball 34 (step 232). When vehicle 12 has been raised an appropriate amount, as discussed above, operating routine 68 can end (step 234), either by controlling brake system 70 to cause vehicle 12 to stop (which can be done progressively as vehicle 12 approaches such a point), or by issuing a command to the user to stop vehicle 12 (which can also be done progressively or by a countdown as vehicle 12 approaches the desired location) before deactivating hitch assist system 10, whereupon system 10 remains inactive until subsequent reactivation thereof (step 236).

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle hitch assistance system, comprising:
    a powered suspension system supporting a rear of the vehicle at a height; and
    a controller configured to:
        acquire position data for a coupler of a trailer;
        determine when the position data indicates that a hitch ball of the vehicle is aligned with the coupler;
        cause the powered suspension system to raise the height of the rear of the vehicle; and
        cause the powered suspension system to stop raising the height of the rear of the vehicle upon determining that the hitch ball is lifting the coupler of the trailer, wherein the controller determines that the hitch ball is lifting the coupler of the trailer based on a detection of an increase in a power draw of the suspension system.

2. The system of claim 1, further comprising a steering system, wherein the controller further:
    derives a vehicle path from an initial vehicle position to an end position wherein the hitch ball is aligned with the coupler; and
    outputs a steering control signal to the steering system to maintain the vehicle along the path.

3. The system of claim 2, further comprising powertrain control and brake systems, wherein the controller further:
    controls the powertrain control and brake systems to cause the vehicle to move along the path from the initial position to the end position.

4. The system of claim 1, further comprising at least one radar unit defining a detection field having at least a portion directed away from the rear of the vehicle, wherein:
    at least a portion of the position data for the coupler is acquired from the at least one radar unit.

5. The system of claim 4, wherein the at least one radar unit includes left and right rear radar units respectively mounted on left-rear and right-rear corners of the vehicle.

6. The system of claim 4, further comprising at least one of a rear vehicle camera and an ultrasonic sensor, wherein:
    the controller acquires at least one additional portion of the position data for the coupler from the at least one of the rear vehicle camera and the ultrasonic sensor.

7. The system of claim 1, wherein the controller further causes the powered suspension system to lower the height of the rear portion of the vehicle prior to the hitch ball of the vehicle being aligned with the coupler.

8. The system of claim 7, wherein:
    the position data for the coupler of the trailer includes a height of the coupler; and
    the causing of the powered suspension system to lower the height of the rear of the vehicle positions the hitch ball of the vehicle at a height lower than the height of the coupler.

9. A vehicle, comprising:
    a hitch ball mounted on a rear of the vehicle;
    a suspension system adjustably supporting the rear of the vehicle at a height; and
    a controller configured to:
        acquire position data for a coupler of a trailer;
        determine when the position data indicates that the hitch ball is aligned with the coupler;
        cause the suspension system to raise the height of the rear of the vehicle while receiving measurement data of a current drawn by the suspension system; and
        stop raising the height of the rear of the vehicle upon determining that the measurement data of the current drawn by the suspension system indicates an increase in a power draw of the suspension system attributable to the hitch ball beginning to raise the coupler.

10. The vehicle of claim 9, wherein:
    the suspension system is a powered active suspension system; and
    the controller further causes the suspension system to lower the height of the rear of the vehicle prior to the hitch ball of the vehicle reaching the aligned condition with the coupler.

11. The vehicle of claim 10, wherein:
the position data for the coupler of the trailer includes a height of the coupler; and
the causing of the suspension system to lower the height of the rear portion of the vehicle positions the hitch ball at a height lower than the height of the coupler.

12. The vehicle of claim 11, wherein:
the suspension system adjustably supports the entire vehicle at a height; and
the controller causes the suspension system to raise the height of the entire vehicle.

13. The vehicle of claim 9, further comprising at least one radar unit defining a detection field having at least a portion directed away from the rear of the vehicle, wherein:
at least a portion of the position data for the coupler is acquired from the at least one radar unit.

14. The vehicle of claim 13, wherein the at least one radar unit includes left and right rear radar units respectively mounted on left-rear and right-rear corners of the vehicle.

15. The vehicle of claim 13, further comprising at least one of a rear vehicle camera and an ultrasonic sensor, wherein:
at least one additional portion of the position data for the coupler is acquired from the at least one of the rear vehicle camera and the ultrasonic sensor.

16. A method for assisting a vehicle in hitching with a trailer, comprising:
acquiring position data for a coupler of the trailer;
determining when the position data indicates that a hitch ball of the vehicle is aligned with the coupler;
causing a powered suspension system supporting a rear of the vehicle at a height to raise the height of the rear of the vehicle; and
stopping the raising of the height of the rear of the vehicle upon determining that the hitch ball is lifting the coupler,
wherein the hitch ball is determined to be lifting the coupler of the trailer based on a detection of an increase in a power draw of the suspension system.

* * * * *